United States Patent [19]

Dworak et al.

[11] 4,278,574
[45] Jul. 14, 1981

[54] POLYSILOXANE-MODIFIED PAINT BINDERS AND PROCESS FOR PRODUCING THE BINDERS

[75] Inventors: Gert Dworak; Hansjörg Aigner, both of Graz, Austria

[73] Assignee: Vianova Kunstharz, A.G., Werndorf, Austria

[21] Appl. No.: 971,002

[22] Filed: Dec. 19, 1978

[30] Foreign Application Priority Data

Dec. 27, 1977 [AT] Austria ................. 9304/77

[51] Int. Cl.³ ............... C08L 35/00; C08L 67/02
[52] U.S. Cl. .................. 260/22 CB; 260/22 S; 525/101; 525/103; 525/444; 525/446
[58] Field of Search ............. 260/827, 22 S, 22 CB; 525/101, 103, 444, 446

[56] References Cited

U.S. PATENT DOCUMENTS

| | | |
|---|---|---|
| 3,015,637 | 1/1962 | Rauner et al. ............ 260/22 S |
| 3,655,602 | 4/1972 | Sekmakas ............... 260/29.2 M |
| 3,894,978 | 7/1975 | Montesissa et al. ....... 260/22 CB |
| 4,032,494 | 6/1977 | Gentry .................... 525/101 |
| 4,069,178 | 1/1978 | Mikami et al. ........... 260/22 S |
| 4,076,666 | 2/1978 | Power et al. ............ 260/22 CB |
| 4,105,607 | 8/1978 | Fischer et al. .......... 260/22 CB |

FOREIGN PATENT DOCUMENTS

542265 6/1957 Canada ................. 260/22 S

Primary Examiner—Wilbert J. Briggs, Sr.
Attorney, Agent, or Firm—A. W. Breiner

[57] ABSTRACT

Paint binders having an intrinsic viscosity of from 8-15 ml/g which are water soluble upon neutralization with bases comprising the condensation reaction product of (A) 50-85% by weight of a polyester resin modified with 5-40% by weight of a polysiloxane of the general formula

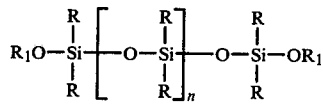

wherein
R is an alkyl, cycloalkyl, aryl or alkoxy radical,
$R_1$ is hydrogen or an alkyl radical and
n is an integer of from 0–40;
said modified polyester having a hydroxyl number of from about 50–400 mg KOH/g, an acid value of below about 10 mg KOH/g, and an intrinsic viscosity of from about 6–11 ml/g, measured in dimethylformamide at 20° C.; and
(B) 15–50% by weight of a film forming resin containing carboxyl groups to provide an acid value of from about 100–300 mg KOH/g and an intrinsic viscosity of from about 5–9 ml/g, measured in dimethylformamide at 20° C.; the ratio of the intrinsic viscosity values of components (A) and (B) being governed by the relation $\eta A/\eta B = 1.2$ to 2.2.

The paint binders, at a high solids content and with a high water to organic solvent ratio, have a viscosity sufficiently low to be suitable for spray applications. The paint binders in paint formulations provide paint films having good physical characteristics.

17 Claims, No Drawings

POLYSILOXANE-MODIFIED PAINT BINDERS AND PROCESS FOR PRODUCING THE BINDERS

The present invention is directed to a process for producing polysiloxane-modified paint binders and to the resultant binders which permit the formulation of high solids paints having viscosities suitable for spraying with low proportions of organic auxiliary solvents.

Heretofore, paint binders have been modified with polysiloxanes for the purpose of improving the weather resistance of the paints prepared therefrom. Water-dilutable copolymers containing in co-condensed form hydroxy functional or alkoxy functional polysiloxanes are described in U.S. Pat. No. 3,655,602. The products disclosed therein exhibit good gloss on electrodeposition, which gloss is ascribed to the polysiloxane modification. The use of other methods of application, particularly by spraying of these binders requires a relatively high level of auxiliary organic solvents, since the resins upon dilution with water at the solids content suitable for practical use have a viscosity which is too high for spraying.

Polysiloxane-modified polyesters having a low acid value which are then modified by reaction with trimellitic anhydride to provide a resin having an acid value of about 45 mg KOH/g, and after neutralization with an amine is converted to the water-soluble form are also known. These polysiloxane-modified polyesters have the same shortcomings as the binders disclosed in U.S. Pat. No. 3,655,602. Moreover, even with the co-employment of amine resins, the aforesaid polysiloxane-modified binders require baking temperatures of 160° C. and more to obtain adequate crosslinking.

It has now been found that it is possible to produce water-soluble polysiloxane-modified paint binders which give films with superior weather resistance which can be processed to provide paints with relatively low quantities of auxiliary organic solvents and which at a solids content sufficiently high for paint application have a viscosity level optimal for spray applications.

The process of producing paint binders modified with polysiloxanes which are water-soluble upon neutralization with bases according to the present invention is characterized in that (A) 50–85% by weight of a polyester resin modified with 5–40% by weight of a polysiloxane of the general formula

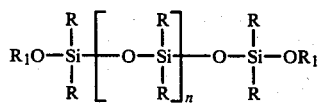

wherein

R is an alkyl, cycloalkyl or aryl or alkoxy radical,
R₁ is hydrogen or an alkyl radical, and
n is an integer of from 0–40;

the modified polyester having a hydroxyl number of from about 50–400 mg KOH/g, an acid value of about 10 mg KOH/g as a maximum and an intrinsic viscosity of from about 6–11 ml/g (measured in dimethylformamide at 20° C.)

are condensed at from about 80°–150° C. to an intrinsic viscosity of from about 8–15 ml/g with, (B) 15–50% by weight of a carboxy group containing a film forming resin having an acid value of from 100–300 mg KOH/g and an intrinsic viscosity of from 5–9 ml/g (measured in dimethylformamide at 20° C.), the ratio of the intrinsic viscosity values of components (A) and (B) being governed by the relation $$\eta_A/\eta_B = 1.2\text{–}2.2$$

In the preferred embodiment of the invention 65–80% of component (A) are co-condensed with 20–35% of component (B). The paint binders which are produced, as will be clearly apparent hereinafter, have unique properties.

Component A, as above defined, is prepared by reaction of a hydroxy functional polyester resin with a hydroxyl number of between about 80 and 500 mg KOH/g and an acid value of below 10 mg KOH/g with the polysiloxane compound at from about 120°–220° C., optionally in the presence of catalysts such as zirconium or titanium acid esters. In this reaction the hydroxy groups of the polyester react with alkoxy groups of the polysiloxane with the simultaneous freeing of the corresponding alkanols. The reaction is monitored by the reduced solubility of the reaction batch in methanol and by an increase in intrinsic viscosity $\eta_A$. The separation of the alkanol can be supported by applying a vacuum.

Suitable hydroxy functional polyester resins for reaction to produce component A are prepared in known manner by condensation of a stoichiometric excess of polyalcohols over polycarboxylic acids. Suitable starting alcohols include monoethylene glycol, diethyleneglycol, neopentylglycol, butane diol, hexane diol, triethylene glycol, glycerol, trimethylol propane and pentaerythritol. Suitable starting acids include succinic acid, maleic acid (anhydride), fumaric acid, adipic acid, sebacic acid, o-, m- or p-phthalic acid (anhydride) and its esters, and trimellitic acid (anhydride). Monocarboxylic acids having from 5–20 C-atoms can be co-employed with the dicarboxylic acids. Epoxy group containing compounds are also suitable for use, effectively being latent polyalcohols.

The polysiloxanes suitable for use according to the present invention have the following general formula

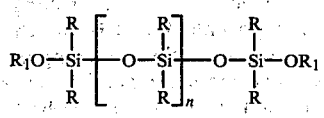

wherein R is an alkyl, cycloalkyl, aryl or an alkoxy radical and R₁ is either hydrogen or an alkyl radical and n lies between 0 and about 40. Included within the formula are the oligomeric and polymeric substituted hydroxy silanes or alkoxy silanes which are obtained by hydrolysis or alcoholysis of di- or trifunctional alkyl, cycloalkyl or aryl substituted silanes. The preferred polysiloxanes are the low molecular alkoxy-functional alkylphenylsiloxanes carrying about 10–20% of methoxy groups and optionally 5–10% of butoxy groups, the alkyl radicals of which are mainly methyl groups. The molecular weight of these preferred polysiloxanes ranges between about 500 and 2000. Component A for use according to this invention has a polysiloxane level of about from 5–40%, a hydroxyl number of from about 50–400 mg/KOH g, and an intrinsic viscosity of about from 6–11 ml/g (measured in dimethylformamide at 20° C.). The intrinsic viscosity is determined according to the method disclosed in *Ullmanns Encyklopadie der Technischen Chemie*, 3rd Edition, Volume II/1, at page 779.

The resins of component B have acid values of between about 100 and 300 mg KOH/g and an intrinsic viscosity of from about 5-9 ml/g (measured in dimethylformamide at 20° C.). Furthermore, the resins can contain subordinate quantities of hydroxy groups. The resins are considered to be film forming when at room temperature on a surface which is not porous, or at least not highly porous; and give a coherent, clear film without tendency to crystallize. Compounds suitable for use as component B include addition products of maleic anhydride to unsaturated monocarboxylic acids, particularly to unsaturated fatty acids and the natural oils based thereon and the dehydrated and isomerized derivatives thereof. Furthermore, copolymers of maleic anhydride can be used with alpha,beta-ethylenically unsaturated monomers such as (meth)acrylates, (meth)acrylamides, styrol, vinyltoluol, and the like. The carboxy groups of the aforesaid copolymers are substantially or totally derived from dicarboxylic acid structures. The anhydride structures in the mentioned resins are opened prior to reaction with component A by hydrolysis or semi-ester formation with monohydric alcohols. An additional group of suitable film-forming polycarboxylic acid resins are polyester resins prepared by condensation of a stoichiometric excess of polycarboxylic acids with polyalcohols, with co-employment of monocarboxylic acids. The polyalcohols mentioned for the preparation of component A, as well as the polycarboxylic acids, monocarboxylic acids and epoxy compounds, are suitable in preparing the polyester of component B. Preferred polyesters are those where the free carboxyl groups are derived from an aromatic polycarboxylic acid such as phthalic acid, trimellitic acid, and the like.

The condensation of the polysiloxane-modified polyester resin (component A) and the film-forming carboxyl group containing resin (component B) is carried out at temperatures of from about 80° to 150° C. As above stated, 50-85% by weight of component A, preferably 65-80%, is reacted with from 15-50% by weight, preferably 20-35%, of component B. It is critical, however, in addition to controlling the weight quantities of components A and B that the quotient of the intrinsic viscosities of the two components, viz. $\eta$A and $\eta$B, be within a certain range. For the process of the invention, this quotient should range between 1.2 and 2.2. The reaction is monitored by watching the changes in the intrinsic viscosity, the increase in water solubility of the reaction product upon neutralization with nitrogen bases, and the behavior of an aqueous solution upon addition of monoethylene glycol monobutyl ether. A turbidity test is carried out in order that about 30 ml of an aqueous solution containing about 3% of resin solids are blended with 1 cc butyl glycol. The condensation of the components is preferably carried to the point where at room temperature no additional turbidity occurs with the addition of the solvent. During partial condensation the acid value will fall by a maximum of 15 units as compared to the value of the component blend. The intrinsic viscosity (measured in dimethylformamide at 20° C.) of the condensation product ranges from between about 8 to 15 ml/g, the acid value being from 20 to 60 mg KOH/g. When the condensation is finished, the carboxy groups of the condensation product are at least partially neutralized with nitrogen bases. Suitable bases include ammonia, diethyl amine, triethyl amine, N,N-dimethyl ethanol amine, diethanol amine, and the like.

In order to increase the degree of crosslinking on stoving, the condensation product can be mixed with from about 10-40% based on the total binder of a preferably etherified phenol or amine formaldehyde condensate. Hexamethoxy-alkylmelamines are preferably used.

The condensates prepared according to the invention, in their water-soluble form, either alone or in admixture with crosslinkers, form stable aqueous solutions with from clear to highly opalescent appearances. The co-employment of auxiliary organic solvents is not necessary. However, organic solvents can be present as residual by-product of the synthesis of one of the components.

Crosslinking of the products is carried out by stoving at from about 130°-150° C. The products can be employed as paints in pigmented or unpigmented form. Particularly outstanding results are observed when the binders are used in metallic paints. By fixing the position of the metal particles, the binders contribute to the formation of a haze-free and cloud-free metallic effect in the paint coating. The improved gloss as compared to that of binders based on normal alkyd or acrylic resins can be further enhanced by applying an additional clear varnish coating.

The following examples illustrate the invention without restricting its scope. All parts are by weight and percentages refer to parts by weight. The intrinsic viscosity was measured throughout in dimethylformamide at 20° C.

Component A 1:

90 parts of a polyester prepared from 7 mols of neopentylglycol, 2.15 mols of hexane diol, 4.77 mols of phthalic anhydride, 0.69 mols of adipic acid and 1 mol of trimellitic anhydride, and having an acid value of 5 mg KOH/g and a hydroxyl number of 134.5 mg KOH/g are condensed with 10 parts of an available methylphenyl siloxane (molecular weight about 1000, methoxyl content about 14%) and with 0.5 parts of butyl titanate at 190° C. until an intrinsic viscosity of 7.7 ml/g is obtained. The product has an acid value of 2 mg KOH/g, a hydroxyl number of 93.5 mg KOH/g and an efflux time of 220 seconds DIN 53 211 at 20° C. using a 60% solids solution in monoethyleneglycol monobutyl ether.

Component A 2

70 parts of a polyester prepared from 10.04 mols of neopentylglycol, 2.15 mols of hexane diol, 5.15 mols of phthalic anhydride, 0.69 mols of adipic acid and 0.75 mols of trimellitic anhydride, and having an acid value of 4 mg KOH/g and a hydroxy number of 276 mg KOH/g, are condensed at 190°-200° C. with 30 parts of the polysiloxane used in component A 1 and 0.5 parts of butyl titanate, until an intrinsic viscosity of 8.3 ml/g is obtained. The acid value is 1.5 mg KOH/g; the hydroxyl value is 122 mg KOH/g and the efflux time DIN 53 211 is 170 seconds using a 60% solids solution in monoethylene glycol mono butyl ether.

Component B 1

An addition product prepared at 220° C. from 200 parts of tall oil fatty acids, 50 parts of dehydrated castor oil fatty acids and 100 parts of maleic anhydride is reacted at 90° C. for one hour with 35 parts of methanol and 2 parts of triethyl amine. The product has an acid value of 230 mg KOH/g and an intrinsic viscosity of 5.3 ml/g.

Component B 2

A copolymer of 22 parts of maleic anhydride, 63 parts of n-butylacrylate and 20 parts of methylmethacrylate is prepared as a 67% solids solution in methylisobutylketone and is then treated with 5 parts of water, 2 parts of diacetone alcohol and 0.5 parts of triethylamine, for 2 hours at about 100° C. The resin has an acid value of 160 mg KOH/g and an intrinsic viscosity of 6.2 ml/g.

Component B 3

334 parts of castor oil, 1 part of triethyl amine and 153 parts of trimellitic anhydride are reacted at 150° C. until an acid value of 183 mg KOH/g is attained. The batch is diluted to a solids content of 80% with diacetone alcohol. The intrinisic viscosity is 6.4 ml/g.

EXAMPLE 1

In a reaction vessel equipped with stirrer, reflux condensor and water separation, 77.5 parts of Component A 1 and 34.5 parts of Component B 2 are charged and heated to 110° C. and condensed for about 4–5 hours, until the initial acid value of 40 mg KOH/g has dropped to 28 mg KOH/g. The intrinsic viscosity is 10.3 ml/g. 30 ml of a 3% aqueous solution with slightly opaque appearance does not get more turbid with the addition of 1 g of monoethyleneglycol monobutyl ether. At 80° C. a blend of 4.6 g of dimethylethanol amine and 134 parts of water is stirred in thoroughly. The resin has a solids content of 40%. The pH-value of a 10% aqueous solution is 8.

EXAMPLE 2

77.5 parts of Component A 2 and 34.5 parts of Component B 2 are heated to 105° C. and condensed for about 5 hours until the acid value of 40 mg KOH/g has fallen to 30 mg KOH/g. The intrinsic viscosity is 8.65 ml/g. 30 cc of an aqueous solution does not get more turbid upon addition of 1 g of monoethylene glycol monobutyl ether. At 80° C., a blend of 4.8 parts of dimethylethanolamine and 83.2 parts of water are admixed thoroughly. The resin has a solids content of 50%. The pH-value of a 10% aqueous solution is 8.3.

EXAMPLE 3

77.5 parts of Component A 2 are condensed with 22.5 parts of component B 1 in the presence of 10 parts of diacetone alcohol, at 130° C., until the acid value of initially 46 mg KOH/g has fallen to 34 mg KOH/g. The intrinsic viscosity is 8.2 ml/g, and the addition of monoethylene glycol monobutyl ether does not show turbidity according to the turbidity test as above stated. At 60° C. a blend of 4.7 parts of dimethylethanol amine and 135 parts of water is stirred in thoroughly. The product has a solids content of 40%.

EXAMPLE 4

70 parts of Component A 2 and 37.5 parts of Component B 3 are condensed at 120° C. until an intrinsic viscosity of 8.5 ml/g is attained and the acid value has fallen to 50 mg KOH/g. Upon addition of 9.1 parts of dimethylathanolamine the batch is diluted with water to a solids content of 40%.

COMPARISON EXAMPLE 400 parts of polysiloxane-modified polyester made from 13.1 mols of neopentylglycol, 3.04 mols of phthalic anhydride, 1.98 mols of adipic acid, 1.63 mols of trimellitic anhydride and 1195 parts of an available methylphenylsiloxane (with a molecular weight of about 1000 and a methoxyl content of about 14%) and having an intrinsic viscosity of 5.5 ml/g and an acid value of 3 mg KOH/g, are condensed at 170° C. with 39.3 parts of trimellitic anhydride until an acid value of 43 mg KOH/g is obtained. The batch is blended at 95° C. with 27.7 parts of dimethylethanolamine and 183.3 parts of ethylene glycol monoethyl ether. The solids content of the resulting blend is 75%.

Table 1 sets forth paint formulations which are ready for use which give excellent paint films upon spray application at the listed stoving conditions. The technical progress over the state of the art is particularly apparent from the columns of the Table, paints solids, solvent content and water/solvent ratio. The essential feature is the higher efficiency of the spraying of the products of the invention. With the listed examples, with three cross-wise spray applications, the obtainable film thickness is by 10–15 μm higher than with known products. Another noteworthy feature is the excellent standing on vertical surfaces.

Stoving conditions:
Examples of the invention:
  flash-off: 8 minutes
  stoving: 30 minutes/130° C.
Comparison example:
  flash-off: 15 minutes
  Stoving: 30 minutes/160° C.
Application, flash-off and stoving was carried out on vertical surfaces:
Substrate:
  (a) steel panel
  (b) steel panel, EC-primer underneath
For the comparison paint the flash-off time has to be prolonged to avoid sagging (runners).

TABLE 1

| Paint | A | B | C | D | E | CP |
|---|---|---|---|---|---|---|
| Example 1 | 187.5 | — | — | — | — | — |
| Example 2 | — | 150 | — | — | — | — |
| Example 3 | — | — | 187.5 | — | — | — |
| Example 4 | — | — | — | 187.5 | — | — |
| Example 5 | — | — | — | — | 187.5 | — |
| Comparison Example | — | — | — | — | — | 111 |
| Hexamethoxymethylmelamine | 25 | 25 | 25 | 25 | 25 | 25 |
| Titanium dioxide | 80 | 80 | 80 | 80 | 80 | 80 |
| Diethyleneglycol monobutylether | 1 | — | 1 | — | 1 | — |
| Monoethyleneglycol-monobutylether | — | — | — | — | — | 19 |
| Sec. butanol | 3 | — | 3 | — | 3 | — |
| p-toluol sulfonic acid, 20% in water neutralized | — | — | 1.5 | — | — | — |

TABLE 1-continued

| Paint | A | B | C | D | E | CP |
|---|---|---|---|---|---|---|
| Flow agent | 1 | — | 1 | 1 | 1 | 1 |
| Deionized water | 22 | 50 | 20 | 42 | 21 | 134.5 |
| Paint solids, % | 56.5 | 59 | 56.6 | 53.8 | 56.7 | 48.7 |
| Viscosity, DIN 53 211, s | 23 | 23 | 24 | 21 | 23 | 35 |
| Organic solvents level, %, in the ready to use paint | 5.5 | 4.5 | 5.6 | 3.7 | 5.2 | 14.9 |
| Ratio Water/Organic solvent | 87/13 | 89/11 | 87/13 | 92/8 | 88/12 | 71/29 |

As is apparent from the flash-off and stoving characteristics, and the data of Table 1, the curing of the paints using the binders of this invention is substantially enhanced over the prior art. Further, in addition to providing a film having a greater thickness, the water to organic solvent ratio is substantially improved, as are the percent solids and viscosity characteristics. It will be apparent that various modifications can be made in the working examples including a substitution of materials and a variation in the reaction sequence. Such modifications and others being within the ability of one skilled in the art are within the scope of the present invention and appended claims.

Component B 4

To an adduct of 100 parts of dehydrated castor oil, 200 parts of linseed oil and 100 parts of maleic anhydride, 85 parts of diacetone alcohol and 3 parts of triethylamine are added and it is hydrolysed with 30 parts of water. The acid value of the product is 250 mg KOH/g, the intrinsic viscosity 6.8 ml/g.

EXAMPLE 5

77.5 parts of Component A 2 and 28.2 parts of Component B 4 are dissolved in 4.3 parts of diacetone alcohol and condensed at 120° C., until the acid value has fallen from 54 mg KOH/g to 50 mg KOH/g. At 80° C. a blend of 6.5 parts of dimethylethanol amine and 133.5 parts of water is stirred in. The resin solution has a solids content of 40% and a pH-value of 7.8 (measured on a 10% aqueous solution).

It is claimed:

1. A process for producing paint binders water soluble upon neutralization with bases wherein
   (A) 50-85% by weight of a polyester resin containing chemically bonded thereto from 5-40% by weight of a polysiloxane of the general formula

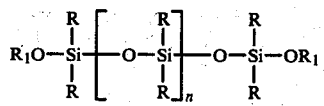

wherein
   R is an alkyl, cycloalkyl, aryl or alkoxy radical,
   $R_1$ is hydrogen or an alkyl radical and
   n is an integer of from 0-40;
   said polyester having a hydroxyl number of from about 50-400 mg KOH/g, an acid value of below about 10 mg KOH/g, and an intrinsic viscosity of from about 6-11 ml/g, measured in dimethylformamide at 20° C.; and
   (B) 15-50% by weight of a film forming resin selected from the group consisting of
   (a) addition products of maleic anhydride to unsaturated fatty acids or their esters of their dehydrated or isomerized derivatives,
   (b) copolymers of maleic anhydride with other alpha, beta-ethylenically unsaturated monomers, and
   (c) polyester resins prepared by using a stoichiometric excess of polycarboxylic acids, whereby the anhydride groups of (a) and (b) are opened by hydrolysis or semiester formation with monohydric alcohols;
   said resin containing carboxyl groups to provide an acid value of from about 100-300 mg KOH/g and an intrinsic viscosity of from about 5-9 ml/g, measured in dimethylformamide at 20° C.; the ratio of the intrinsic viscosity values of components (A) and (B) being governed by the relation $$\eta A/\eta B = 1.2 \text{ to } 2.2,$$

are condensed at about 80°-150° C. to an intrinsic viscosity of from about 8-15 ml/g.

2. Process according to claim 1 wherein components (A) and (B) are used in amounts of from about 65-80% to about 20-35%, respectively.

3. Process according to claim 1 wherein component (A) is an alkyd resin modified with alkylphenylsiloxanes containing from 10-20% of methoxy groups.

4. Process according to claim 3 wherein said alkylphenylsiloxanes further contain from 5-10% of butoxy groups.

5. Process according to claim 1 wherein component (B) is an addition product of maleic anhydride and unsaturated fatty acids.

6. Process according to claim 1 wherein component (B) is an addition product of natural oils and their derivatives.

7. Process according to claim 1 wherein component (B) is a copolymer of maleic anhydride and a member of the group consisting of (meth)acrylate; styrene, vinyltoluene, and mixtures thereof.

8. Process according to claim 1 wherein component (B) is a polyester with free carboxy groups.

9. Process according to claim 1 wherein the acid value of the blend of components (A) and (B) during condensation falls by a maximum of 15 acid value units.

10. Paint binders having an intrinsic viscosity of from about 8-15 ml/g water soluble upon neutralization with bases comprising the condensation reaction product of
   (A) 50-85% by weight of a polyester resin containing chemically bonded thereto from 5-40% by weight of a polysiloxane of the general formula

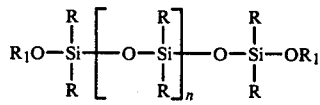

wherein

R is an alkyl, cycloalkyl, aryl or alkoxy radical,
R₁ is hydrogen or an alkyl radical and
n is an integer of from 0-40;
said polyester having a hydroxyl number of from about 50-400 mg KOH/g, an acid value of below about 10 mg KOH/g, and an intrinsic viscosity of from about 6-11 ml/g, measured in dimethylformamide at 20° C.; and (B) 15-50% by weight of a film forming resin selected from the group consisting of
(a) addition products of maleic anhydride to unsaturated fatty acids or their esters of their dehydrated or isomerized derivatives,
(b) copolymers of maleic anhydride with other alpha, beta-ethylenically unsaturated monomers, and
(c) polyester resins prepared by using a stoichiometric excess of polycarboxylic acids, whereby the anhydride groups of (a) and (b) are opened by hydrolysis or semiester formation with monohydric alcohols;
said resin containing carboxyl groups to provide an acid value of from about 100-300 mg KOH/g and an intrinsic viscosity of from about 5-9 ml/g, measured in dimethylformamide at 20° C.; the ratio of the intrinsic viscosity values of components (A) and (B) being governed by the relation $$\eta a/\eta B = 1.2 \text{ to } 2.2.$$

11. Paint binders of claim 10 wherein components (A) and (B) are reacted in amounts of from about 65-80% to about 20-35%, respectively.

12. Paint binders of claim 10 wherein component (A) is an alkyd resin modified with alkylphenylsiloxanes containing from 10-20% of methoxy groups.

13. Paint binders of claim 12 wherein said alkylphenylsiloxanes further contain from 5-10% of butoxy groups.

14. Paint binders of claim 10 wherein component (B) is an addition product of maleic anhydride and unsaturated fatty acids.

15. Paint binders of claim 10 wherein component (B) is an addition product of natural oils and their derivatives.

16. Paint binders of claim 10 wherein component (B) is a copolymer of maleic anhydride and a member of the group consisting of (meth)acrylate; styrene, vinyltoluene, and mixtures thereof.

17. Paint binders of claim 10 wherein component (B) is a polyester with free carboxy groups.

* * * * *